United States Patent [19]

Cobden

[11] 4,415,306
[45] Nov. 15, 1983

[54] TURBINE

[76] Inventor: Kenneth J. Cobden, Flat 1, 369 Deakin Ave., Mildura, Victoria 3500, Australia

[21] Appl. No.: 370,283

[22] Filed: Apr. 20, 1982

[51] Int. Cl.³ .............................................. F03D 1/04
[52] U.S. Cl. ..................................... 415/2 A; 416/189
[58] Field of Search ............................. 415/2 A, 4 A; 416/189 A

[56] References Cited

U.S. PATENT DOCUMENTS

| 1,312,021 | 8/1919 | Dickinson et al. | 415/4 A X |
|---|---|---|---|
| 1,433,995 | 10/1922 | Fowle | 415/2 A X |
| 1,502,433 | 7/1924 | Johanson | 415/2 R X |
| 1,578,923 | 3/1926 | Schlotter | 415/2 A X |
| 2,123,657 | 7/1938 | Munk | 416/189 A X |
| 2,701,526 | 2/1955 | Rotkin | 102/70.2 |
| 3,339,078 | 2/1967 | Crompton | 290/44 |
| 4,021,135 | 5/1977 | Pedersen et al. | 415/2 |
| 4,086,498 | 4/1978 | Szoeke | 415/2 A X |
| 4,143,992 | 3/1979 | Crook | 415/2 A |
| 4,147,472 | 4/1979 | Kling | 416/189 A X |
| 4,159,191 | 6/1979 | Graybill | 416/11 |
| 4,321,476 | 3/1982 | Buels | 415/2 A X |
| 4,324,985 | 4/1982 | Oman | 290/55 |

FOREIGN PATENT DOCUMENTS

| 492087 | 3/1978 | Australia . | |
|---|---|---|---|
| 513247 | 11/1980 | Australia . | |
| 804090 | 4/1951 | Fed. Rep. of Germany | 416/189 A |
| 542445 | 8/1922 | France | 415/144 |
| 909378 | 5/1946 | France | 416/135 |
| 975625 | 3/1951 | France | 415/3 A |
| 1038090 | 9/1953 | France | 416/11 |
| 213022 | 3/1924 | United Kingdom | 416/189 A |

Primary Examiner—Everette A. Powell, Jr.
Attorney, Agent, or Firm—Pearne, Gordon, Sessions, McCoy, Granger & Tilberry

[57] ABSTRACT

A wind turbine comprising a rotor mounted in a housing, aero-foil blades on the rotor extending in cantilever fashion forwardly of the rotor to be parallel to the axis of the rotor. The blades carry at their free ends a rotatable fairing of aero-foil section so that the blades are situated at the center of lift of the aero-foil section so that the air flows through the blades to the area of lower air pressure.

14 Claims, 5 Drawing Figures

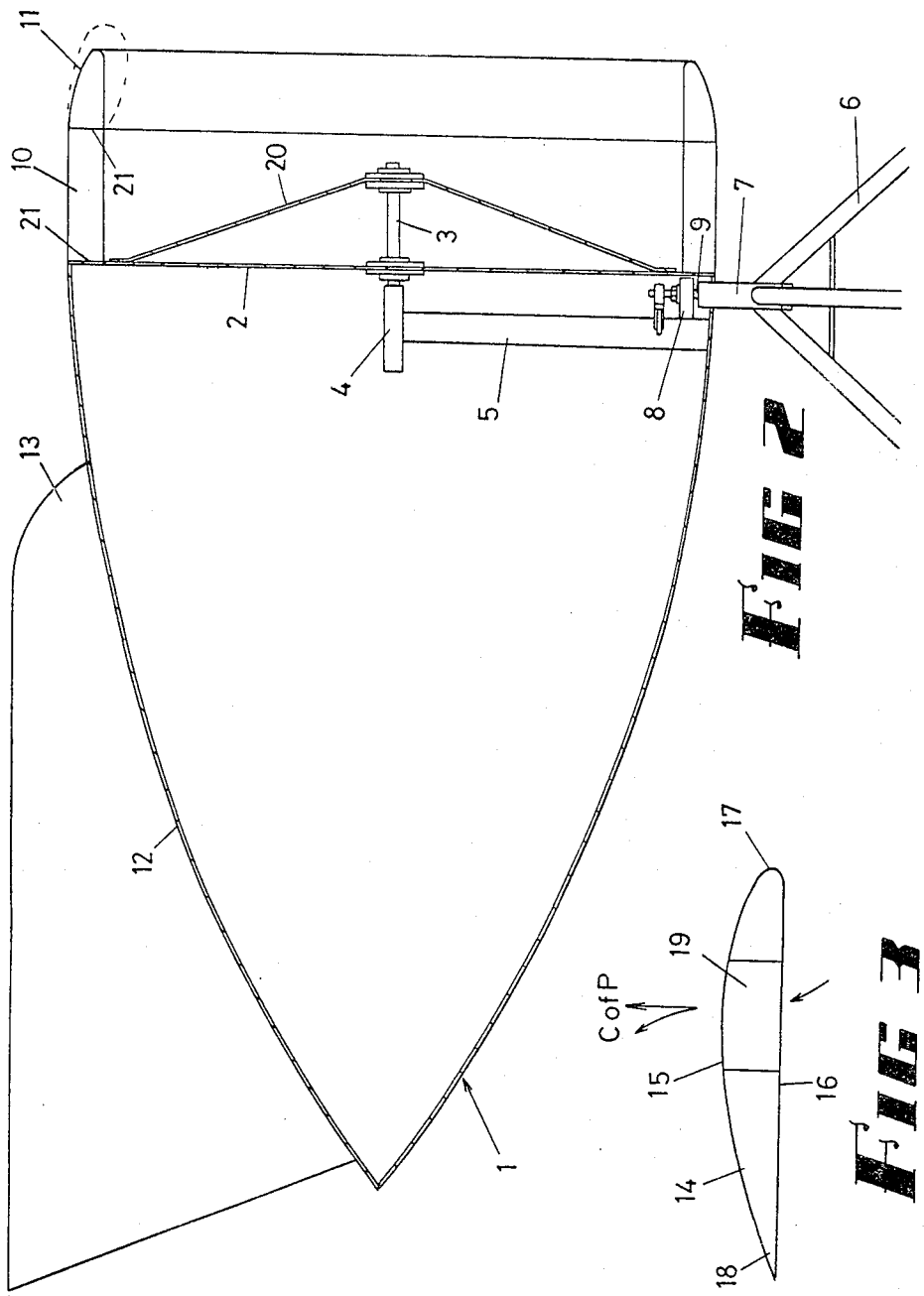

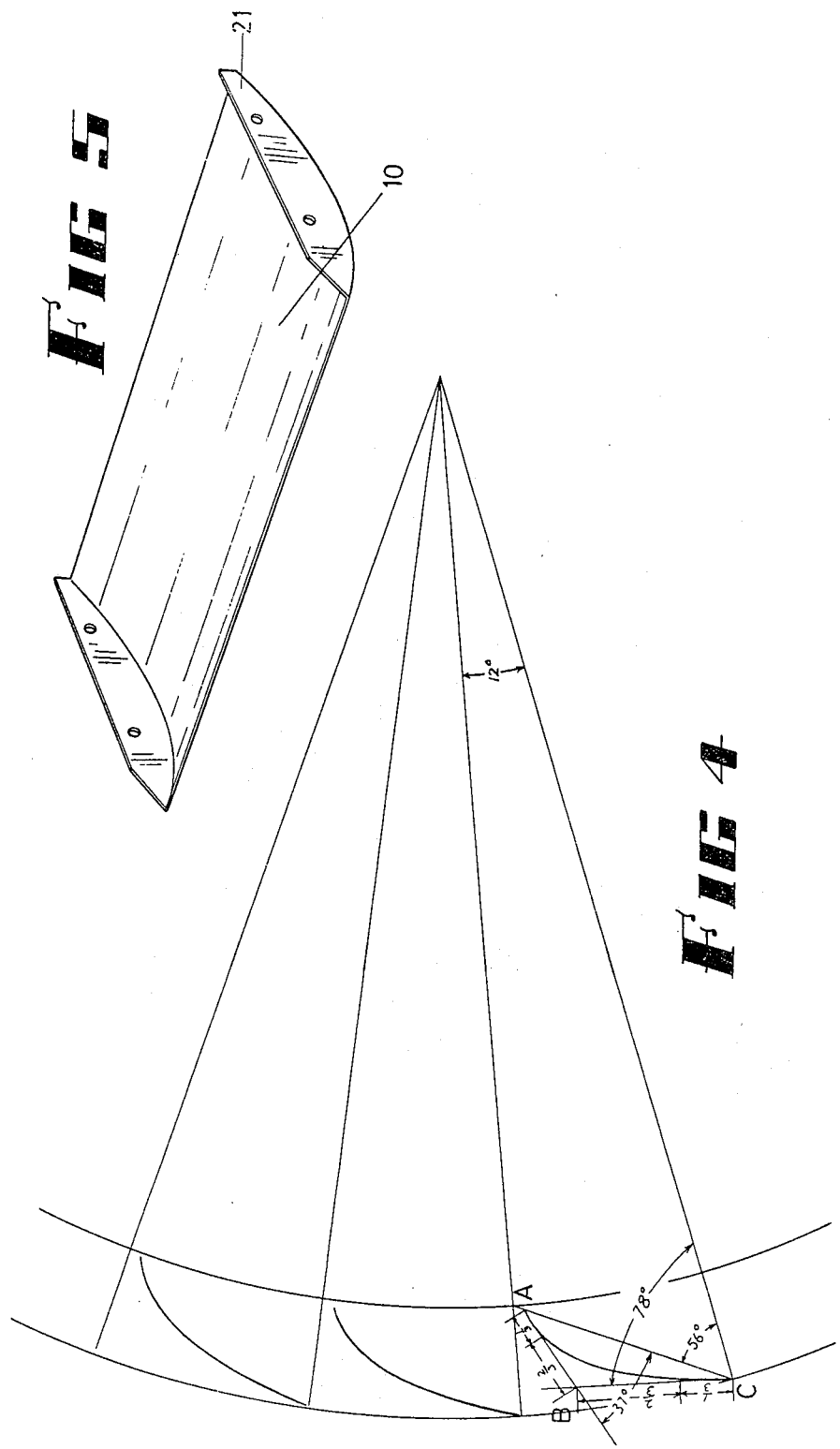

TURBINE

This invention relates to a fluid turbine, more particularly to a wind turbine although it may also be driven by other fluids such as water.

BACKGROUND OF THE INVENTION

Units for extracting the power from the wind have been known for centuries for driving mills, pumping water and the like. However these were very inefficient and had to be large in order to produce the required power.

Of recent years turbines have been developed in order to achieve greater efficiency from smaller units. Australian Pat. No. 513,247 discloses a wind turbine assembly having a rotor with a plurality of vanes in radially spaced relation to the axis, and flow controlling duct means to conduct a radial outflow of air against the vanes, the turbine having an aero-foil surface formed on an inlet duct, the vanes being situated in a low pressure area at the trailing edge of the aero-foil.

Australian Patent Application No. 213,391/77 discloses a turbine rotor having vanes mounted in a convergent-divergent duct, flow channels through the duct wall controlling the boundary layer.

Australian Pat. No. 492,087 shows a wind turbine having a duct in which is mounted stator and rotor blades.

It is an object of this invention to provide an improved wind turbine having advantages over the known art, in that it is more effective in converting the wind energy into motive power.

It is a further object to provide a wind turbine which is effective in delivering power from winds of low velocity.

SUMMARY OF THE INVENTION

There is provided according to the invention a fluid turbine to deliver power extracted from the fluid, a turbine having a rotor mounted for rotation about a axis parallel to the flow, a plurality of vanes carried by said rotor, a housing having in cross-section an aero-foil section, said vanes being situated in a passage through the aero-foil section at a position corresponding generally to the centre of lift of the aero-foil section whereby fluid flows from the high pressure area to the low pressure area of the aero-foil section through the passage to thus act on the turbine blades.

BRIEF DESCRIPTION OF THE DRAWINGS

FIG. 2 is a cross-sectional view of the turbine.

FIG. 3 is a diagramatic-sectional view of the invention.

FIG. 4 is a diagramatic part-sectional view of the vanes on the rotor, and

FIG. 5 is a perspective view of one vane.

DESCRIPTION OF THE PREFERRED EMBODIMENT

Figure 1:
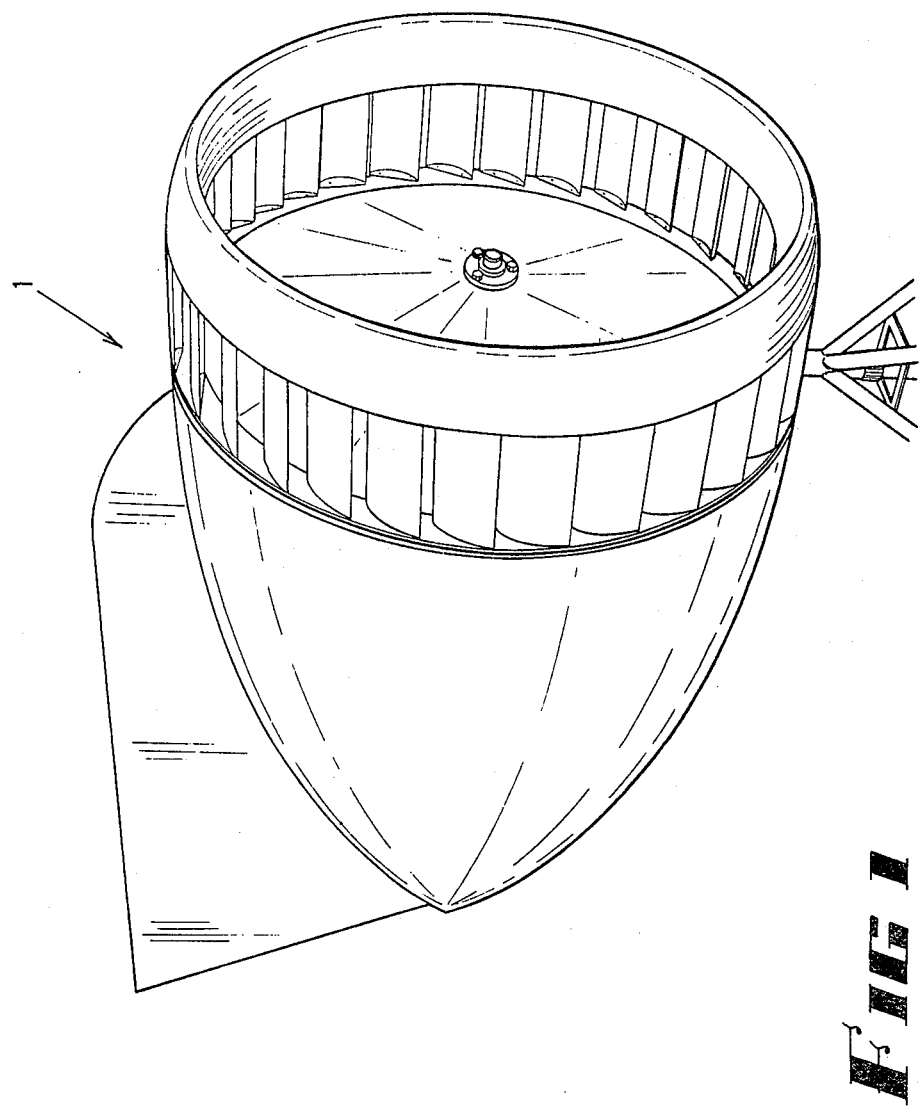
FIG. 1 is a perspective view of a turbine according to the invention.

Referring to the drawings there is shown a turbine 1 having a rotor on turbine wheel 2 mounted on a shaft 3 supporting a bearing 4. Bearing 4 is supported on a frame 5, the turbine 1 being mounted on a shaft supported in a bearing 7. The drive from the turbine wheel 2 can in this embodiment be by a friction wheel 8 attached to a drive shaft 9 which passes downwardly through the pedestal 6 and from which motive power may be obtained.

The turbine wheel 2 carries a plurality of vanes 10 to which are attached a forward fairing 11.

The turbine 1 also includes a hollow aerodynamically shaped body or housing 12, a tail portion 13 being provided so that the turbine unit will be quickly orientated into the prevailing air flow.

Turning now to FIG. 3 there is shown a aero-foil section 14 having an upper surface 15, lower surface 16, leading edge 17 and trailing edge 18. As is known with aero-foil sections, there is a reduced pressure formed over the upper surface and that there is an area or portion at which the centre of pressure is considered to act. If now it is considered that a duct or passage 19 is formed through the aero-foil section at the centre of pressure, that the air flow forming the reduced pressure above the aero-foil will cause a flow of fluid through the passage into the area of reduced pressure. This concept is utilised in the present invention and it will be seen that the fairing 11 merges into the housing 12 to form an aero-foil shape, the fairing 11 being curved in an aero-foil section with an inner surface generally parallel to the axis of the turbine, and an aero-foil curved outer surface, so that the air flow over the outer surface is accelerated relative to the flow along the inner surface into the turbine.

The turbine wheel 2 is also provided with a conical deflecting surface 20 which also is mounted on the shaft 3 and joins to the turbine wheel adjacent to the vanes.

The vanes 10 are attached to the turbine wheel and extend forwardly in cantilever fashion, the vanes carrying at their forward end the fairing 11 which thus rotates with the vanes. As shown in FIGS. 4 and 5 the vanes 10 are formed in this example of sheet metal with end flanges 21 by which the vanes are mounted on the turbine wheel 2 and to which the fairing is attached. It has been found that each of the vanes subtend an angle in the order of 8 to 16 degrees, but preferably 12 degrees and it is preferred that each vane of a chord length in the vicinity of 100 mm at least; for it is well known in the model aircraft art that this is the minimum chord length which is required to achieve satisfactory lift and performance.

Each of the blades is shaped so that the leading edge is straight for approximately one third of its length along the line angle A-B, and similarly the trailing edge is straight for approximately one third of its length along the line angle B-C.

The chord line A-C is preferably situated between 50 and 60 degrees but more particularly 56 degrees from the radial line, and the leading edge angle A-B is situated between 30 and 40 degrees from the chord line, more particularly 37 degrees, with the trailing edge line B-C being situated between 75 and 85 degrees, more particularly 78 degrees from the radial line.

With the blades so arranged, the point of highest position of the aero-foil section of the blade is situated generally directly opposite the trailing edge of the preceding vane.

Thus taking this area between the blades that is from the trailing edge of one blade to the highest point of the next trailing blade, this area between the blades is approximately 2½ times less than the inlet area, but considering the total area of the blade exhaust around the circumference of the turbine, this is equal to the inlet area.

In this way it was seen that the air flowing over the turbine unit creates a low pressure area at the exhaust of the blades, and thus the air in passing through the blades into this low pressure area causes the turbine wheel to rotate.

In rotating, the nose fairing also rotates, and this rotation it is believed causes a layer of air to trail or rotate with the inlet fairing thus causing a rotating mass of air which in effect extends the aero-foil shape of the fairing, and thus creates an aero-foil shape of greater depth which enhances the low pressure area behind the rotating inlet fairing and so creates a greater low pressure area into which the air will exhaust.

As the inlet area of the turbine is equal to the exhaust area between the blades, there is no back pressure created, but in effect the opposite occurs due to the fact that the blades exhaust the air into the low pressure area of the aero-foil section.

It will be seen also that due to the positioning of the blades that the forces acting on the blades over the whole length of the blade are all acting at the same radius, and the forces are thus tangential over the whole length of the blade at the maximum radius so that a greater turning effect is achieved.

Thus with the blades being mounted to extend generally parallel to the axis of the turbine, and with the blades being formed in an aero-foil section, the chord line and the aero-foil section extends generally in the direction of movement of the blade, that is generally tangentially to the turbine disc, but with the blade being inclined so that the leading edge is at a lesser radius than the trailing edge.

In an alternative embodiment, the inlet fairing may not be attached to the vanes, but maybe mounted on a spider or the like attached to the shaft, but in this embodiment the radial attachments from the shaft to the fairing would interfere with the air flow, and also the advantage of the rotating inlet fairing would not be achieved.

The turbine unit can be used for supplying any motive power either driving an electrical generator, hydraulic pump, or mechanically to any desired unit requiring a motive power. For example an electrical generator or a hydraulic pump may be mounted directly or through gearing in the turbine housing itself.

The unit could be provided for pumping water in remote areas, providing electrical power to a direct power source or for charging batteries or the like. For example it can be mounted on sailing craft, yachts and the like to provide electrical power for lighting, cooking and communications.

The unit would also operate in water and could be used in areas of flowing water such as streams with a generation of power.

I claim:

1. A fluid turbine unit to deliver power extracted from a moving fluid, the turbine having a turbine wheel mounted for rotation about an axis parallel to the fluid flow, a plurality of cantilever vanes mounted on said turbine wheel and extending to forward vane ends, an inlet fairing mounted for rotation adjacent the forward vane ends of said vanes, said inlet fairing having a cross-section which provides an aero-foil section such that fluid flowing over the outside of the inlet fairing is accelerated relative to the fluid flowing into the turbine, said vanes being situated in a passage through the aero-foil section at a position corresponding generally to the center of lift of the aero-foil section whereby the fluid flows through the passage to the lower pressure area of the aero-foil section to act on the turbine vanes.

2. A fluid turbine unit as defined in claim 1 wherein said vanes are of aero-foil shape each having its chord line tangential to the turbine wheel.

3. A fluid turbine unit as defined in claim 2 wherein said turbine includes a housing extending rearwardly from said vanes, the housing forming a continuation of the aero-foil section, the vanes being attached at their forward vane ends to said inlet fairing, the inlet fairing rotating with the turbine wheel so that in operation the rotating fairing induces an enlarged artificial aero-foil section to increase the aero-foil affect on the moving fluid.

4. A fluid turbine unit as defined in any one of claims 1 to 3 wherein the fluid turbine unit is a wind turbine unit, the housing having a stabilising tail, and is mounted on a pedestal for rotation about a vertical axis.

5. A fluid turbine unit as defined in claim 3 where the vanes are formed of pressed metal each having a straight leading edge and a straight trailing edge the vanes being curved to aero-foil shape and positioned with the trailing edge of a leading vane opposite the high point of the next trailing vane to form a constricted passage with the outlet area of the vanes being of equal area to the inlet area of the turbine unit.

6. A fluid turbine unit as defined in claim 3 and including drive means to engage the turbine wheel, the drive means driving a shaft extending through the pedestal and coinciding with the said vertical axis.

7. A fluid turbine unit as set forth in claim 1, wherein said fluid turbine is a wind turbine unit and includes a housing having an aerodynamically shaped portion extending rearwardly from said vanes, each of said vanes has a leading edge and a trailing edge with respect to the direction of rotation about said axis and a chord line extending between said edges, said leading edge is spaced a lesser radial distance from said axis than said trailing edge, the chord line of each of said vanes subtends an angle in the range of from about 8° to about 16°, and said aerodynamically shaped portion of said housing provides a continuation of said aero-foil section of said inlet fairing with said vanes being disposed at said aero-foil section adjacent the peripheral extent of the fairing and aerodynamically shaped portion of the housing.

8. A fluid turbine unit as set forth in claim 7, wherein said aero-foil section is substantially free of radial interruption by said vanes.

9. A fluid turbine as set forth in claim 7, wherein said chord line of each of said vanes subtends an angle equal to 12° and each of said vanes has a chord length measured along the chord line of at least 100 mm.

10. A fluid turbine as set forth in claim 7, wherein each of said vanes has a cross-section including a substantially linear portion extending from each of the edges thereof and joining with a curved aero-foil intermediate portion.

11. A fluid turbine unit as set forth in claim 3, wherein said vanes include rearward ends, said rearward and forward ends comprising end flanges for respectively securing said vanes between said turbine wheel and inlet fairing.

12. A fluid turbine as set forth in claim 11, wherein each of said vanes has an aero-foil section provided by a sheet material extending between said end flanges.

13. A fluid turbine as set forth in claim 12, wherein said end flanges comprise integral extensions of said sheet material.

14. A fluid turbine as set forth in claim 13, wherein said sheet material is sheet metal.

* * * * *